July 4, 1933.  L. P. SMITH  1,917,162
MOTOR OPERATED TUFTING MACHINE
Filed June 23, 1932
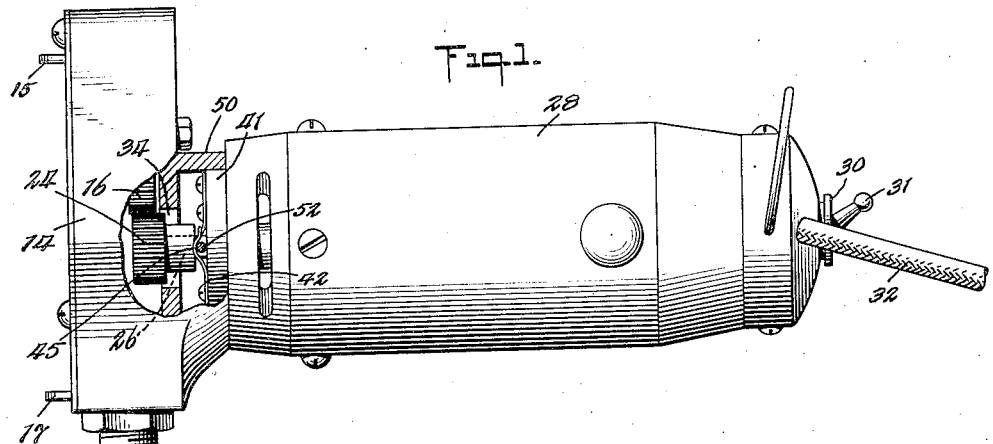
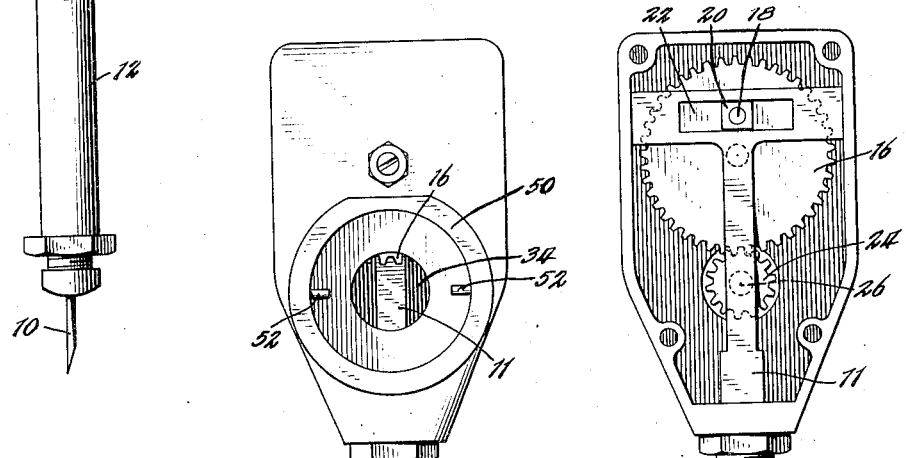
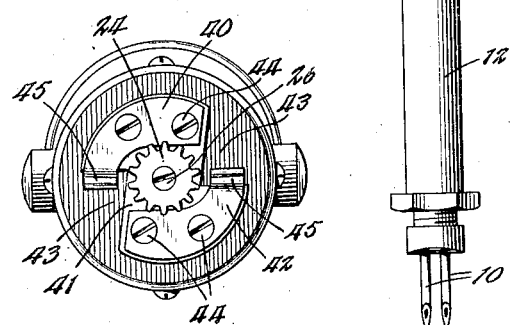
INVENTOR
LAWRENCE P. SMITH
by his attorneys
Norton and Norton Patented July 4, 1933

1,917,162

UNITED STATES PATENT OFFICE

LAWRENCE P. SMITH, OF DALTON, GEORGIA, ASSIGNOR TO "CABIN CRAFTS", OF DALTON, GEORGIA, A CORPORATION OF GEORGIA

MOTOR OPERATED TUFTING MACHINE

Application filed June 23, 1932. Serial No. 618,965.

This invention relates to power operated tufting machines of the type that are manually movable over the design to be worked. Heretofore most power operated tufting machines have obtained their power through a flexible shaft which connected the machine and source of power. This limited the amount of movement of the machine for the reason that the flexible shaft could only be bent a small amount. Furthermore, if the flexible shaft became damaged, the machine had to remain idle although it and the source of power were both able to run.

It is an object of my invention to provide a manually movable motor operated tufting machine which does not employ a flexible shaft, by embodying an electric motor in a portion of the machine itself.

Another object of my invention is to associate a motor with a tufting machine in such a manner that it will not interfere with whatever free movement of the machine may be necessary to follow out intricate designs.

Another object of my invention is to associate a motor with a machine in such a way that it may be readily connected to and disconnected from the machine.

Other objects and advantages of my invention will appear as it is described in connection with the accompanying drawing.

In the drawing:—

Figure 1 is a side elevation view of a tufting machine embodying the principles of my invention.

Figure 2 is an end elevation view of the machine shown in Figure 1 with the cover of the casing removed to show the operating mechanism.

Figure 3 is an elevation view of the side opposite to that shown in Figure 2, of the casing containing the operating mechanism, when the motor is disconnected from the casing.

Figure 4 is an elevation view of the inner end of the motor and handle.

Referring to the drawing, a tufting needle or needles 10 are mounted in the lower end of a T-shaped plunger 11 which is slidable in a cylindrical tube 12 that is connected to the bottom of a casing 14. This casing 14 contains the mechanism for moving the plunger 11 which mechanism comprises a large spur gear 16 rotatably mounted in the upper part of the casing. In the side of this gear is a pin 18 having a rectangular block 20 pivotally mounted thereon and slidable in a slot 22 in the upper end or T head of the plunger 11. A mechanism similar to and operating on the same principle as that just described is disclosed and claimed in the copending application of George L. Westcott, Serial No. 606,424.

The spur gear 16 is caused to rotate by a smaller spur gear 24 which is secured upon the end of a shaft 26 that is rotatably mounted axially within a cylindrical casing 28 extending perpendicularly from the casing 14. An armature of an electric motor is wound upon the shaft 26 within the cylindrical casing 28 which serves not only as a housing for the motor but also as the handle for the tufting machine. Since there are many small motors in the electrical art which are capable of incorporation in the cylindrical casing 28, the construction of the motor is not illustrated in the drawing and need no be described in detail. It is sufficient to say that the motor must be designed to fit into a handle that is of such size that it can be conveniently grasped in the hand of the machine operator. A switch 30 is conveniently incorporated in the outer end of the handle 28 and by manipulation of the lever 31 of this switch, the motor may be stopped or started. Current is fed to the motor by a flexible feed wire 32 which enters the outer end of the casing 28 in position so that it will not interfere with the vision of the operator nor will it interfere with manipulating the machine.

The handle and motor 28 are detachably connected to the casing 14 by means as will now be described.

An aperture 34 is made in the side of the casing 14 adjacent the handle 28, this aperture being of sufficient size to permit the withdrawal of the spur gear 24 when the motor is pulled away from the casing 14. The means for connecting the motor and handle to the casing comprise a pair of arcuate resilient sheet metal members 40, 42 which are secured in diametrically opposite positions to the end of the handle 28 by screws 44. One end of each of these resilient members 40, 42 is crimped forming a ridge 45 extending radially of the handle. These resilient members are mounted upon a cylindrical boss 41 of lesser diameter than, and extending from the end of, the casing 28. Portions of the boss are cut away providing recesses or pockets 43 on opposite sides of the boss beneath the crimped ends of the resilient members. Referring to Figures 1 and 3, it will be noted that one side of the casing 14 is provided with a laterally extending circular flange 50 surrounding, at some distance, the aperture 34. The inner diameter of the flange 50 is of approximately the same diameter as the boss 41 so that the boss may fit within said flange. Projecting radially inward from diametrically opposite positions within said flange are two short pins 52 which are adapted to move into the pockets 43 that are cut in the boss 41. In coupling the handle with casing 10, the handle is moved axially to put the gear 24 through the aperture 34, while at the same time causing the pins 52 to move into the pockets 43 at the side thereof away from the ends of the members 40, 42. Then the handle is rotated clockwise about its axis causing the ridges 45 to slide over the pins and, still engaging them, to hold them against those edges of the pockets which are beneath the members 40, 42. The members 40, 42 though resilient are stiff enough to firmly hold the handle in the position just described, while the machine is in use.

According to conventional practice the yarn is led down through guides 15 and 17 in the side of the casing opposite to the handle 28 and through a slot 18' in the tube 12 to the tufting needles 10. It will be obvious that one or more tufting needles may be used as desired, the only limit as to the number of needles being the dimensions of the plunger.

By reason of the location of the motor in the handle of the machine, much greater flexibility of movement of the machine is possible than was possible with the machines for this purpose which have heretofore been known. It is of great advantage to have the handle and motor detachable from the machine, since by this means, the motor can be used for several machines which may have different characteristics, such as a smaller or larger number of teeth on the gear 18 by which the speed of the machine might be increased or reduced, or a machine with a larger or different number, or size of tufting needles might be required for a certain piece of work.

Many modifications and changes within the scope of my invention will occur to those skilled in the art and therefore I do not limit the invention to the specific form of the invention illustrated in the drawing.

I claim:—

1. A tufting machine comprising a casing, means in said casing for reciprocating tufting elements, means projecting laterally from said casing and forming a handle for said machine, and an electric motor in said handle for operating said tufting-element-operating means, and means on said casing and said handle means cooperating upon relative rotation of said handle means with respect to said casing to detachably secure said handle means to said casing.

2. A tufting machine comprising a casing, means in said casing for reciprocating tufting elements, means projecting laterally from said casing and forming a handle for said machine, driving means in said handle means for operating said tufting-element-operating means, a shaft extending from said handle into said casing, means on said shaft engaging with said tufting-element-operating means for transmitting power from said driving means to said tufting element operating means, and means to detachably secure said handle means to said casing.

3. A tufting machine comprising a casing, means in said casing for reciprocating tufting elements, means projecting laterally from said casing and forming a handle for said machine, an electric motor in said handle means for operating said tufting-element-operating means, and means detachably connecting said handle means with said casing.

4. A tufting machine comprising a casing, means in said casing for reciprocating tufting elements, means projecting laterally from said casing and forming a handle for said machine, driving means in said handle means for operating said tufting-element-operating means, a pin and a resilient tongue on said handle means and casing cooperating to detachably connect said handle means and casing.

5. A tufting machine comprising a casing, means in said casing for reciprocating tufting elements, means projecting laterally from said casing forming a handle for said machine, an electric motor in said handle means for operating said tufting-element-operating means, means detachably connecting said handle means with said casing, a shaft extending from said handle into said casing, means on said shaft engaging with said tufting-element-operating means for transmitting power from said driving means to said tufting-element-operating means.

In testimony whereof I have signed my name to this specification.

LAWRENCE P. SMITH